United States Patent
Peters et al.

(10) Patent No.: US 8,963,045 B2
(45) Date of Patent: Feb. 24, 2015

(54) NON-LINEAR ADAPTIVE CONTROL SYSTEM AND METHOD FOR WELDING

(75) Inventors: Steven R. Peters, Huntsburg, OH (US); Bruce E. Fulmer, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 383 days.

(21) Appl. No.: 11/533,141

(22) Filed: Sep. 19, 2006

(65) Prior Publication Data
US 2008/0078812 A1    Apr. 3, 2008

(51) Int. Cl.
*B23K 9/10* (2006.01)
*B23K 9/095* (2006.01)

(52) U.S. Cl.
CPC ............ *B23K 9/0953* (2013.01); *B23K 9/0956* (2013.01); *G05B 2219/42036* (2013.01); *G05B 2219/45135* (2013.01)
USPC .................... 219/130.1; 219/130.5; 219/137.7

(58) Field of Classification Search
USPC ..................... 219/130.21, 130.5, 137.7, 130.1
See application file for complete search history.

(56) References Cited

U.S. PATENT DOCUMENTS

| | | |
|---|---|---|
| 2,938,107 A | 5/1960 | Pease |
| 3,342,973 A | 9/1967 | Smith et al. |
| 3,627,978 A | 12/1971 | Endo et al. |
| 3,746,833 A | 7/1973 | Ujiie |
| 4,076,974 A * | 2/1978 | Gee ............................. 219/108 |
| 4,246,463 A | 1/1981 | Shutt et al. |
| 4,806,735 A | 2/1989 | Ditschun et al. |
| 4,849,601 A * | 7/1989 | Haefner et al. ............... 219/110 |
| 4,897,522 A | 1/1990 | Bilczo et al. |
| 5,001,326 A | 3/1991 | Stava |
| 5,136,139 A | 8/1992 | Gilliland |
| 5,155,330 A | 10/1992 | Fratiello et al. |
| 5,245,546 A | 9/1993 | Iceland |
| 5,278,390 A | 1/1994 | Blankenship |
| 5,349,157 A | 9/1994 | Blankenship |
| 5,351,175 A | 9/1994 | Blankenship |
| 5,676,857 A | 10/1997 | Parker |
| 5,715,150 A | 2/1998 | Stava |
| 5,864,116 A | 1/1999 | Baker |
| 6,002,104 A | 12/1999 | Hsu |
| 6,015,964 A | 1/2000 | Baker |
| 6,111,216 A | 8/2000 | Stava |
| 6,172,333 B1 | 1/2001 | Stava |
| 6,207,929 B1 | 3/2001 | Stava et al. |
| 6,291,798 B1 | 9/2001 | Stava |

(Continued)

FOREIGN PATENT DOCUMENTS

| | | |
|---|---|---|
| GB | 282527 | 12/1927 |
| GB | 554687 | 7/1943 |

OTHER PUBLICATIONS

Lincoln Electric, Power Feed 10 Wire Drive & Control Box, Boom Mount or Bench Model, IM584-D, Oct. 2003.
Lincoln Electric, NA-5 Automatic Welding Systems, Automatic Wire Feeders, pp. 1-8.

(Continued)

*Primary Examiner* — Henry Yuen
*Assistant Examiner* — Ayub Maye
(74) *Attorney, Agent, or Firm* — Hahn Loeser & Parks LLP (57) ABSTRACT

Nonlinear adaptive welders and power source controls are provided along with welding methods method for regulating a welding process, in which one or more welding waveform parameters are adapted in nonlinear fashion based on measured welding process feedback information.

19 Claims, 6 Drawing Sheets

(56) References Cited

U.S. PATENT DOCUMENTS

| | | | |
|---|---|---|---|
| 6,441,342 B1 | 8/2002 | Hsu | |
| 6,472,634 B1 | 10/2002 | Houston et al. | |
| 6,486,439 B1 | 11/2002 | Spear et al. | |
| 6,498,321 B1* | 12/2002 | Fulmer et al. | 219/130.33 |
| 6,515,259 B1* | 2/2003 | Hsu et al. | 219/130.51 |
| 6,624,388 B1 | 9/2003 | Blankenship et al. | |
| 6,649,870 B1 | 11/2003 | Barton et al. | |
| 6,683,279 B1 | 1/2004 | Moerke | |
| 6,700,097 B1 | 3/2004 | Hsu et al. | |
| 6,717,108 B2 | 4/2004 | Hsu | |
| 6,734,394 B2 | 5/2004 | Hsu | |
| 6,920,371 B2 | 7/2005 | Hillen et al. | |
| 6,940,039 B2 | 9/2005 | Blankenship et al. | |
| 7,842,903 B2* | 11/2010 | Myers | 219/130.51 |
| 2004/0079740 A1* | 4/2004 | Myers et al. | 219/130.51 |
| 2006/0207983 A1* | 9/2006 | Myers et al. | 219/137 PS |

OTHER PUBLICATIONS

Lincoln Electric, Power Wave 455M & Power Wave 455M/STT.

Lincoln Electric, Power MIG 350MP, Publication E7.57, pp. 1-8, Dec. 2004.

Lincoln Electric, Power Feed 10M, Publication E8.266, pp. 1-8, Aug. 2004.

Lincoln Electric, LF-72 and LF-74 Wire Feeders, Publication E8.11, pp. 1-8, Apr. 2005.

Lincoln Electric, Automatic Welding Systems with Solid State Controls, Underwrites Laboratories Listed.

Lincoln Electric, Wave Designer, Arc Works Software Series, S2.20, pp. 1-4, May 2000.

International Search report, International Application PCT/US07/64279, filed Mar. 19, 2007.

Written Opinion, International Application PCT/US07/64279, filed Mar. 19, 2007.

* cited by examiner

| WORKPOINT | PEAK CURRENT $I_P$ | PULSE PERIOD T | BACKGROUND CURRENT $I_B$ |
|---|---|---|---|
| $WP_0 - WP_1$ | $SF_{IP} = f_{IP,1}(WP,GSF)$ | $SF_T = f_{T,1}(WP,GSF)$ | $SF_{IB} = f_{IB,1}(WP,GSF)$ |
| $WP_1 - WP_2$ | $SF_{IP} = f_{IP,2}(WP,GSF)$ | $SF_T = f_{T,2}(WP,GSF)$ | $SF_{IB} = f_{IB,2}(WP,GSF)$ |
| $WP_2 - WP_3$ | $SF_{IP} = f_{IP,3}(WP,GSF)$ | $SF_T = f_{T,3}(WP,GSF)$ | $SF_{IB} = f_{IB,3}(WP,GSF)$ |
| $WP_3 - WP_4$ | $SF_{IP} = f_{IP,4}(WP,GSF)$ | $SF_T = f_{T,4}(WP,GSF)$ | $SF_{IB} = f_{IB,4}(WP,GSF)$ |
| ... | ... | ... | ... |
| $WP_{M-2} - WP_{M-1}$ | $SF_{IP} = f_{IP,M-1}(WP,GSF)$ | $SF_T = f_{T,M-1}(WP,GSF)$ | $SF_{IB} = f_{IB,M-1}(WP,GSF)$ |
| $WP_{M-1} - WP_M$ | $SF_{IP} = f_{IP,M}(WP,GSF)$ | $SF_T = f_{T,M}(WP,GSF)$ | $SF_{IB} = f_{IB,M}(WP,GSF)$ |

STATE/DATA TABLE 169

FIG. 9

NON-LINEAR ADAPTIVE CONTROL SYSTEM AND METHOD FOR WELDING

FIELD OF THE INVENTION

The present invention relates generally to arc welding, and more particularly to adaptive welders, power source controls, and methods for regulating a welding process.

INCORPORATION BY REFERENCE

Examples of advanced waveform controlled switching type welding apparatus and associated tools are disclosed in Shutt U.S. Pat. No. 4,246,463; Blankenship U.S. Pat. No. 5,278,390, Hsu U.S. Pat. No. 6,002,104; Stava U.S. Pat. No. 6,111,216, Stava U.S. Pat. No. 6,207,929; Stava U.S. Pat. No. 6,291,798; Houston U.S. Pat. No. 6,472,634; Spear U.S. Pat. No. 6,486,439; Fulmer U.S. Pat. No. 6,498,321; Blankenship U.S. Pat. No. 6,624,388; Hsu 6,700,097; Hsu U.S. Pat. No. 6,717,108; Hsu U.S. Pat. No. 6,734,394; and Blankenship U.S. Pat. No. 6,940,039, the entireties of which are incorporated herein by reference.

BACKGROUND OF THE INVENTION

Gas Metal Arc Welding (GMAW) and Metal Core Arc Welding (MCAW) are arc welding processes commonly used in industry. Several modes of metal transfer are provided by these processes, including pulsed spray transfer, sometimes referred to as pulse welding. Pulsed spray transfer offers many advantages over other transfer modes including low heat input, low spatter operation, as well as the ability to operate over a wide procedure range. In classic pulse welding theory, the welder output is characterized by a series of high amplitude pulses imposed over a lower amplitude background output, with each pulse ideally transferring a single droplet of molten metal across the welding arc from a consumable wire to the workpiece. With advances in high speed industrial controllers and power inverters, pulse welding parameters may be adjusted to optimize the metal transfer for a given welding application. Most modern pulse welding machines offer several synergic pulse welding modes, with each mode providing a recipe of operating pulse parameters based on wire feed speed for a specific wire type, wire size, gas type, etc. The pulse welding electrical waveform is generally characterized by four parameters, including pulse amplitude, pulse duration, background amplitude, and cycle period or frequency, which together determine the power delivered to the arc. For a given welding consumable, the pulse welding power level is related to a metal melt off rate, and if the process is controlled such that the melt off rate equals the wire feed speed (WFS), the resulting arc length will be at an optimum length. Pulse welding processes may thus provide low heat processes in which the consumable electrode ideally does not contact the weld puddle, where the process is typically performed by high-speed control of the welding signal output in conjunction with wire feed speed control in order to provide a spatterless process that can be performed at a lower heat input than spray or globular transfer methods.

For a given pulse welding process, the pulse waveform is ideally tailored for a specific wire type and size, wire feed speed, deposition rate, and other process specifications, in order to optimize the finished weld quality and reduce the welding time. Modern pulse welding machines feature an adaptive feedback circuit that senses the arc length and modifies, or adapts one or more pulse parameters to maintain the balance of power required to the power supplied and thereby maintain the desired arc length, where the adaptive control operation of the power source is generally preprogrammed and is similar to other feedback systems or algorithms. In practice, the actual arc length is typically measured and compared to a desired arc length with the result being an error term. Based on this error term and a multiplication factor, the feedback system adapts the pulse parameters to maintain the desired arc length. This adaptive control works as long as the adaptive routine does not attempt to modify the pulse parameters beyond physical limitations. For instance, if the pulse amplitude is too low, the current may drop below the pulse transition current and droplets will no longer transfer to the puddle. In another situation, if the background amplitude is too low, the arc will pop out and be lost. Other examples include situations in which the pulse period is too long, where conventional adaptive pulse welding controls will cause the molten droplets to become too large to transfer properly, as well as conditions in which the pulse period becomes too short, where prior adaptive techniques cause the peak profiles to run into each other, causing loss of the effect of the pulsing action. Due to these limitations, the range of conventional adaptive pulse welding controls is limited, whereby there is a need for improved adaptive welding systems and methods.

SUMMARY OF INVENTION

One or more aspects of the invention are now summarized to facilitate a basic understanding of the invention, wherein this summary is not an extensive overview of the invention, and is intended neither to identify certain elements of the invention, nor to delineate the scope thereof. The primary purpose of the summary, rather, is to present some concepts of the invention in a simplified form prior to the more detailed description that is presented hereinafter. The present invention is related to adaptive control of waveform-based welding processes, such as pulse welding, short circuit welding, etc., and may be successfully employed to enhance the ability to tailor welding signal waveforms to a given welding process. Non-linear adaptation of one or more waveform parameters is used in regulating the output signal of a welding power source in creating a welding signal formed as a series of waveforms, and the inventors have appreciated that such non-linear adaptive control can provide improved control in applying waveform-based welding signals to a given welding process. This, in turn, facilitates the ability of welding process engineers to continue to reduce welding times and cost while improving finished weld quality.

In accordance with one or more aspects of the invention, welding systems and control systems are provided. The welding systems include a power source with an output providing a welding signal as a series of waveforms to a welding operation, as well as a feedback system and a controller that provides one or more control signals to the power source according to one or more welding operation values sensed by the feedback system. The controller provides the control signal for selective non-linear adaptation of at least one waveform parameter based at least in part on the value or values from the feedback system in order to regulate the power source output.

Other aspects of the invention provide methods for regulating a welding process, comprising sensing at least one feedback value associated with the welding process and selectively adapting at least one controlled waveform parameter of the welding signal in non-linear fashion based at least in part on the feedback value from the feedback system. The selective parameter adaptation can include comparing the feedback value to a setpoint value to derive an error value, determining a parameter scaling factor for the at least one controlled waveform parameter based on a current workpoint value and the error value, the parameter scaling factor varying non-linearly as a function on the error value, and selectively adapting the controlled waveform parameter according to the error value and according to the parameter scaling factor.

BRIEF DESCRIPTION OF THE DRAWINGS

The following description and drawings set forth certain illustrative implementations of the invention in detail, which are indicative of several exemplary ways in which the principles of the invention may be carried out. The illustrated examples, however, are not exhaustive of the many possible embodiments of the invention. Other objects, advantages and novel features of the invention will become apparent from the following detailed description of the invention when considered in conjunction with the drawings, in which.

DETAILED DESCRIPTION OF THE INVENTION

Referring now to the figures, several embodiments or implementations of the present invention are hereinafter described in conjunction with the drawings, wherein like reference numerals are used to refer to like elements throughout and wherein the illustrated structures are not necessarily drawn to scale. Various non-linear welding waveform parameter control concepts are hereinafter illustrated and described in the context of pulsed GMAW or pulsed MIG welding operations. However, it will be appreciated that the invention is not limited to use in association with the illustrated processes, and may alternatively be employed in any type of waveform-based welding operations.

Figure 1:
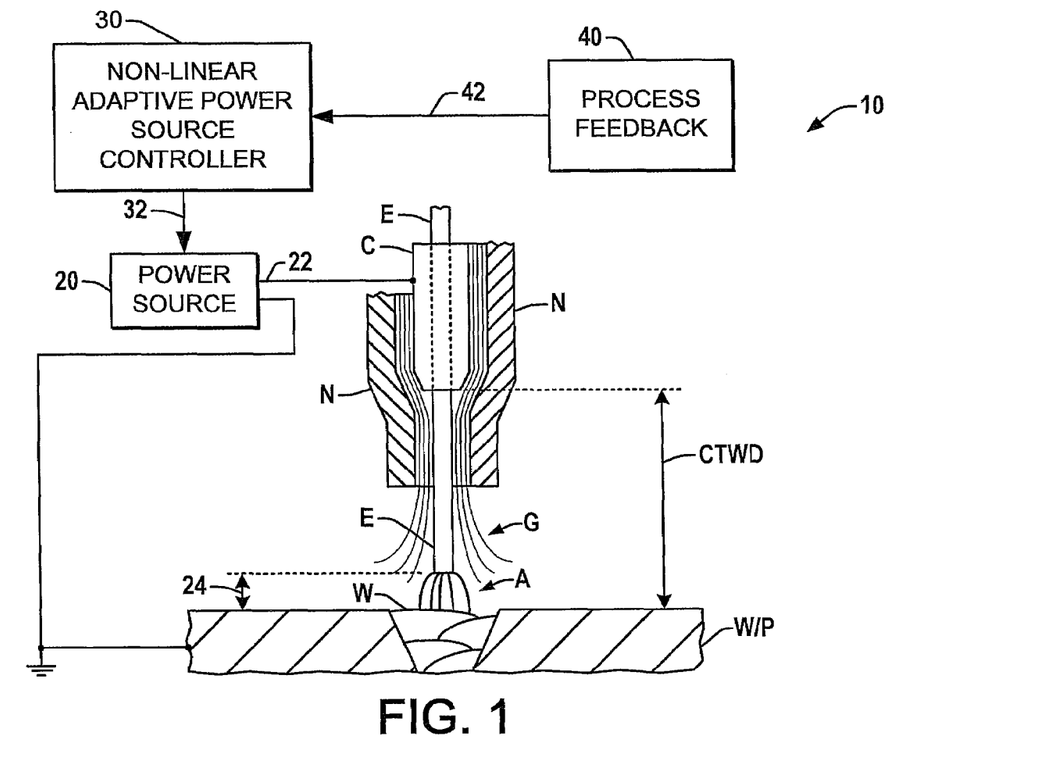
FIG. 1 is a partial side elevation view in section schematically illustrating a welding system with a nonlinear adaptive controller in accordance with one or more aspects of the present invention.

An exemplary welding system 10 is shown in one embodiment in FIG. 1, including a power source 20 with an output 22 providing a welding signal to a welding electrode E via a conductive contact structure C in a pulsed GMAW welding operation. The GMAW operation is provided with a shielding gas G via a nozzle N spaced from and surrounding the contact C and the electrode E providing a passage through which the gas G is transported to provide shielding of the welding operation. The power source 20 provides the welding signal as a series of waveforms by creating a controlled voltage between the electrode E and a grounded workpiece W/P to establish a welding arc A between the lower end of electrode E and the workpiece W/P and/or a weld puddle W thereon. The welding current both establishes the welding arc A having an arc length 24 and melts the lower end of electrode E, wherein the electrode E is advanced toward the weld W at a controlled wire feed speed (WFS) by a wire feeder apparatus (not shown) as part of the welding system 10. In a typical pulse welding implementation, the welding current passes through the electrode from the contact C to the lower electrode end, thereby maintaining the welding arc A and also heating the lower tip of the electrode, whereby a bulbous or ball shaped molten electrode droplet is formed at the lower end of electrode E, and is eventually transferred through the arc A to the weld W, ideally without electrically shorting the electrode E to the workpiece W/P. This process is repeated by the power source 20 providing a succession of welding current waveforms to the electrode E via contact C, with a single droplet being formed and transferred to the weld W in every waveform cycle. The process, moreover, can be regulated to achieve one or more desired performance metrics, for instance, to maintain a given deposition rate or a setpoint wire feed speed or welding voltage level, etc., wherein one or more process control loops can be established for attaining the desired performance. In one example, the operation of the welding system 10 or certain components thereof may be regulated to achieve a certain contact-to-work-distance CTWD, given as the distance from the lower end of the electrode contact C to the workpiece W/P, as shown in FIG. 1.

The welding system 10 also includes a feedback system 40 providing process feedback information 42 based on one or more operational values sensed in the welding process. In addition, a power source controller 30 is provided, which is coupled to receive process information 42 from the feedback system 40 and to provide one or more control signals 32 to the power source 20 for regulating the welding signal in a closed loop fashion. The feedback system 40 may be any suitable measurement, detection, or sensing apparatus by which one or more feedback values 42, such as welding current, welding voltage, etc., are sensed and/or derived, and which provides he value or values 42 to the controller 30. In one possible embodiment, the feedback system includes sensing apparatus (e.g., transducers, shunts, signal conditioning elements, etc.) for measuring process voltages and/or currents, as illustrated and described in greater detail with respect to FIG. 3 below, the feedback system 40 may be a separate component or system or may even be integrated within another system component, such as within power source 20. In general, feedback system 40 may be any suitable hardware, software, firmware, or combinations thereof, which is operatively coupled with the power source 20 and with the controller 30 to sense at least one feedback value associated with the welding operation and to provide one or more feedback signals 42 to controller 30 (e.g., electrical signals, whether analog or digital, wire-based or wireless, etc.) representative, at least in part, of the sensed process feedback value(s).

In accordance with one or more aspects of the present invention, moreover, the power source controller 30 provides selective non-linear adaptation of one or more welding signal waveform parameters in regulating the welding signal according to the process feedback value(s) 42 from system 40. Controller 30 is operatively coupled with the feedback system 40 and with the power source 20 through any suitable operational communicative means, wherein the controller 30 may be any suitable hardware, software, firmware, logic, etc. or combination thereof, which operates to receive feedback information or values 42 from the feedback system 40 and which provides one or more control signals 32 to the welding power source 20 to non-linearly adapt one or more waveform parameters based at least partially on the feedback value(s) 42. In this regard, the power source controller 30 can be a separate component, or may be integrated within another system component, including but not limited to the power source 20 itself, an automatic wire feeder or a system sequence controller (not shown in FIG. 1), or any other component that can communicate with the feedback system 40 and the power source 20, can be operatively coupled directly therewith, or that can communicate therewith via a wired or wireless network or other communications means. In one preferred embodiment, the non-linear adaptive controller 30 is integrated in the power source 20, along with the feedback system 40, in a waveform controlled welder, having suitable user interface and/or network communications apparatus allowing a user to fine tune the non-linear control features described herein to tailor the welding signal waveform parameters to a given welding operation.

As further illustrated and described below, the controller 30 and feedback system 40 together constitute a control system for regulating the output welding signal of the power source 20, which senses a feedback value 42 and selectively adapts one or more waveform parameters based, at least in part, on the feedback value 42 in non-linear fashion. In particular, the power source controller 30 provides the necessary control signal(s) 32 by which the waveform parameter(s) is/are adapted to achieve a desired process performance, where the relationship between the feedback 42 from system 40 and the adapted parameter is non-linear. In this regard, the controller 30 can utilize any suitable technique for generating the control signal(s) 32 so as to selectively adapt (e.g., change) the controlled parameter in non-linear fashion based at least partially on the feedback value(s) 42. In one embodiment, the controller 30 may include one or more non-linear equations or formulas, along with processing apparatus by which a formula can be evaluated or solved for a given measured feedback value 42 to yield a control value 32 which is then provided to the power source 20. Another suitable implementation may utilize lookup table type systems for indexing a given measured feedback value 42 to obtain the corresponding control value 32, wherein the table entries represent non-linear adaptation of one or more waveform parameters based on the feedback 42. In such implementations, moreover, interpolation may, but need not, be employed in indexing the table entries.

By these examples, or other suitable implementations, the controller 30 provides at least one control signal 32 to the power source 20 so as to selectively adapt at least one waveform parameter of the welding signal in non-linear fashion based at least in part on the at least one feedback value 42 from the feedback system 40 to regulate the output of the power source 20. In addition, it is noted that the controller 30 and the control signal(s) 32 provided thereby, may be such that any particular parameter associated with the output welding signal waveform may be non-linearly modified or adapted, including but not limited to adaptation of peak current, background current, peak voltage, background voltage, period, frequency, peak duration, ramp up rate, ramp up time, ramp up target, ramp down rate, ramp down time, and ramp down target, for example. Furthermore, more than one parameter may be adapted via the adaptive controller 30, wherein certain implementations (e.g., FIGS. 5, 7, and 8 below) may provide for selectively adapting two or more waveform parameters in non-linear fashion.

Figure 2A:
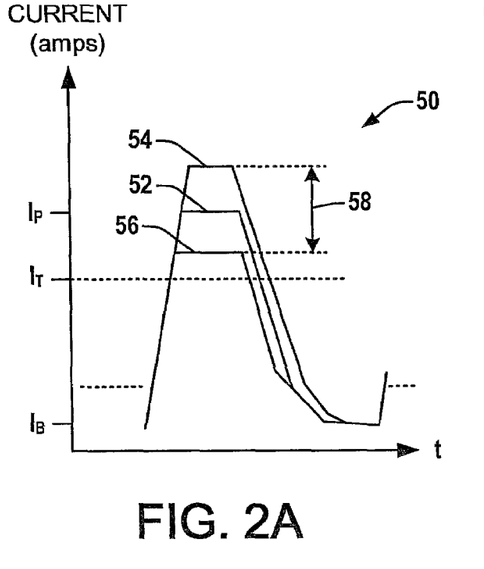
FIG. 2A is a graph illustrating closed loop adaptive control of the peak current value of a GMAW welding pulse using a relatively narrow adaptive control range.
Figure 2B:
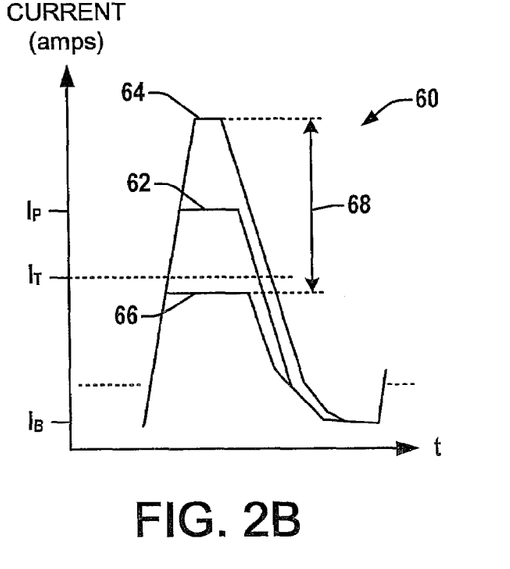
FIG. 2B is a graph illustrating control of the peak current value of a GMAW pulse using a larger adaptive control range extending in one control direction below a spray transition current.

Referring also to FIGS. 2A and 2B, the inventors have appreciated that conventional adaptive control arrangements for welding may suffer from severe operational limitations, often resulting from the physics associated with maintaining or achieving a given type of weld material deposition. In the past, closed loop welding power source controls essentially scaled one or more waveform parameters (e.g., pulse parameters for pulsed GMAW) linearly in order to regulate around a welding operation setpoint value, for example, to change the power source operation based on feedback from the welding system until a desired arc length or CTWD is obtained. However, the nature of a linear response scaling often limits the range of operation of the adaptive response, due at least in part to the process physics. In the context of pulsed GMAW, for example, if the range of adaptive peak current is too large, the adaptive control may force it to drop below a spray transition current, after which droplet type transfer is no longer physically sustainable.

To illustrate this concept, FIGS. 2A and 2B provide graphs 50 and 60, respectively, showing pulse welding current waveforms as a function of time with background current $I_B$, spray transition current $I_T$, and nominal peak current $I_P$ levels indicated on the vertical axis for a pulsed MIG welding situation. In FIG. 2A, the graph 50 shows closed loop adaptive control of the peak current value of a GMAW pulse waveform using a relatively narrow adaptive control range 58 about a nominal peak current value 52 ($I_P$) of about 350 amps. In this example, closed loop welder controls will adapt one or more waveform parameters to maintain the desired arc length (e.g., length 24 in FIG. 1), where the spray transition current level $I_T$ is 270 amps for a given process application (e.g., specific welding electrode E and shielding gas G). The graph 50 in FIG. 2A is illustrative of an operating condition near the middle or upper end of wire feed speed (WFS) settings, at which the defined nominal peak current $I_P$ is significantly above the transition current $I_T$. For a linear adaptive control peak current scaling factor (SF) of 15%, the peak pulse current can be adapted within the range 58 by about 50 amps above or below the nominal value 52, wherein the extreme ends of this example adaptive range are graphically illustrated as waveform 54 showing the highest adapted peak current (e.g., about 400 amps) and waveform 56 showing the lowest adapted peak current (e.g., about 300 amps) at this process control point.

During operation, the specific peak current at any given point in time will be determined based on the feedback (e.g., measured voltage, current, wire feed speed, etc.), that may be scaled and compared with a setpoint value to yield an error value representing the difference between the desired and actual process performance, and a controller scaling factor. In this regard, the scaling factor (SF) values for the adapted parameters (e.g., peak current in this example) may vary with wire feed speed, for instance, where the predominate scale factor is typically the pulse waveform period for low WFS values (e.g., the scaling factor for the period control is high for low WFS values), and the peak current scale factor becomes the predominate adaptive control for mid level or high wire feed speeds (e.g., the scaling factor for peak current is higher at high WFS). In the situation of FIG. 2A, the peak current is adaptable in the range 58 between the maximum and minimum peak levels 54 and 56, respectively, with both these extremes remaining above the spray transition current $I_T$, whereby stable pulse GMAW welding can be maintained throughout the adaptive range 58.

However, using only linear adaptation, the ability to use larger scaling factors or different nominal peak current settings may be limited by the problems encountered when operating at the extremes of the adaptive range. With respect to peak current adaptation, for example, lower nominal peak values $I_P$ and/or wider adaptive ranges, may adapt the actual peak current down below the transition current $I_T$. The graph 60 in FIG. 2B illustrates control of the peak current value of a GMAW pulse using a larger adaptive control range 68 extending in one control direction below the spray transition current $I_T$. In the example of FIG. 2B, the peak current scale factor is increased to 30% in which the spray transition current $I_T$ remains at about 270 amps and the nominal peak current setting 62 is still 350 amps. In this case, the adaptive control can change the peak current within a wider adaptive range 68 by about ±100 amps from the nominal value 62, whereby the maximum peak level 64 is now about 450 amps, but the minimum peak current 66 is only 250 amps, well below the transition current $I_T$ for the selected welding wire and shielding gas combination. At this new lower end of the range 68, normal pulse droplet transfer type welding will cease, due to the physics of the welding operation. It is noted at this point that while restraining the adaptive range may prevent this physical breakdown of the pulse transfer condition, the inventors have appreciated that such a simplistic approach may prevent optimal control of the welding process as a whole. In this regard, larger peak current adaptive ranges (e.g., range 68 in the graph 60 of FIG. 2B) may facilitate improved deposition rates, welding rates, shorted weld times, etc., by taking advantage of higher maximum peak current levels (e.g., peak level 64), thereby improving overall system performance in a given welding application.

Similar physical process limitations may lead to adaptive range restrictions with respect to other welding waveform parameters. In the context of pulsed MIG welding, for instance, the pulse waveform frequency parameter has similar constraints imposed by the physics of the droplet transfer process, wherein extreme increases in the waveform frequency may result in the pulse peaks being too close together to maintain the desired droplet transfer operation. Thus, if the range of adaptive frequency is too great, the frequency may be driven so high that the pulses are virtually driven into each other, leading to a breakdown in the normal pulse welding droplet transfer condition and effectively eliminating the background segments of the pulse waveform, again due to the physics of the process itself. Other physical limitations result from the physics of maintain the welding arc A between the electrode E and the workpiece W/P, for example, where reducing the background current level too far (e.g., $I_B$ in FIGS. 2A and 2B), may result in a loss of the arc A (FIG. 1). In another example, decreasing the peak duration waveform parameter too far in a pulse welding situation may end normal droplet transfer. These are just a few examples of physical restrictions on simple linear adaptive control techniques that limit the ability to optimally control pulse welding processes, wherein other waveform-based welding processes have similar restrictions on the extent to which one or more waveform parameters may be practically adapted. Thus, one objective of the present invention is to allow large adaptive ranges in pulse and other waveform-type welding processes, while allowing the restraints driven by the physics of a given process to be addressed as well.

Figure 3:
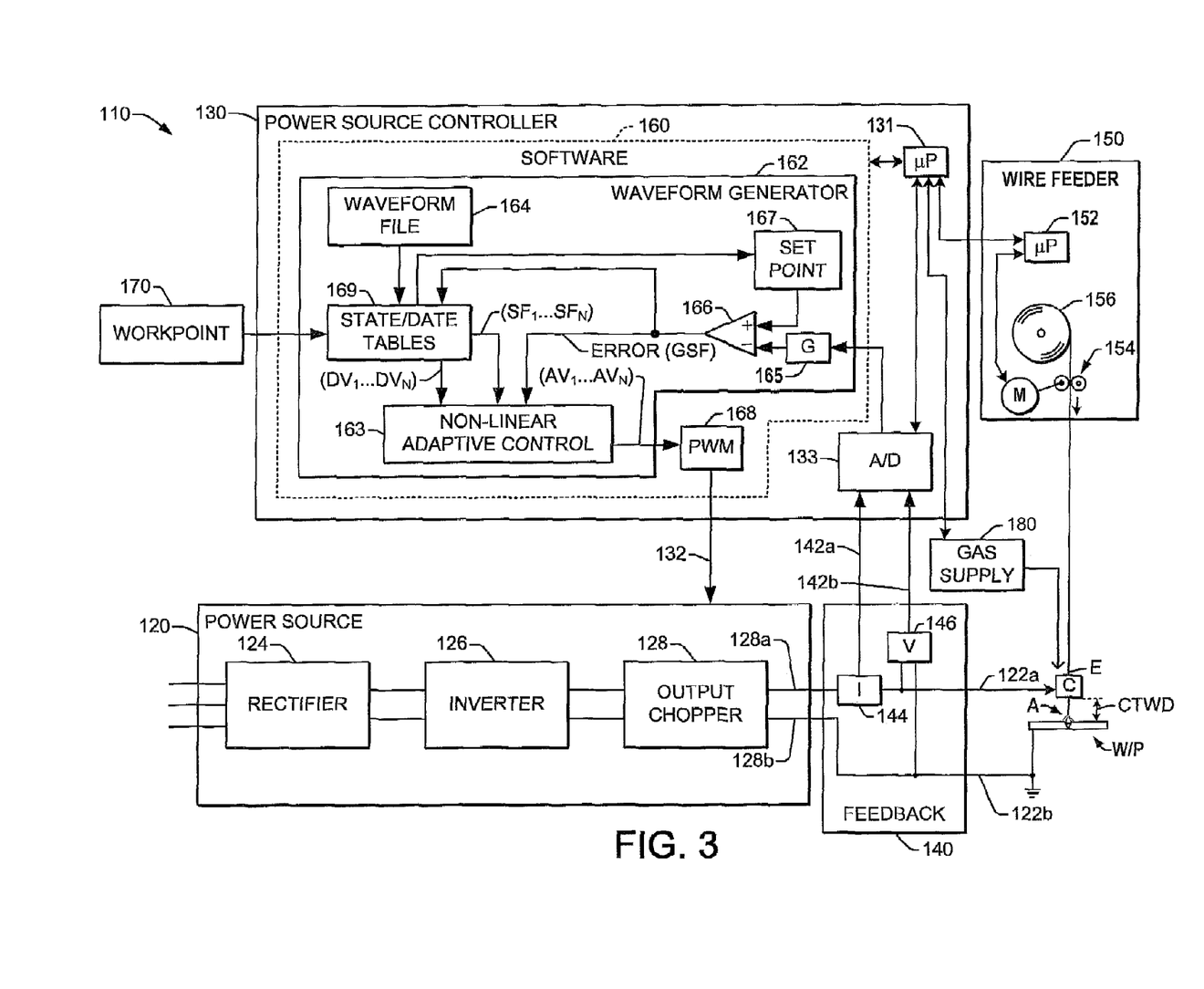
FIG. 3 is a detailed schematic system diagram illustrating a welding system with nonlinear adaptive power source control system in another preferred embodiment of the invention.

FIG. 3 illustrates another embodiment of a welding system 110 providing non-linear adaptive control features in accordance with certain aspects of the present invention, again shown for ease of illustration in the exemplary context of a pulse GMAW operation. The welding system 110 comprises a power source 120 receiving input power (e.g., three phase AC electrical power), and providing an output at output terminals 122a and 122b, with terminal 122a being coupled to the electrode contact C and terminal 122b being coupled with the grounded workpiece W/P in the illustrated example. Power source 120 is a waveform controlled switching type, having an input rectifier 124 providing a DC bus to an inverter 126, which in turn feeds an output chopper 128 providing an output at terminals 128a and 128b to a feedback system 140 and then to the ultimate output terminals 122. The power source output 122 provides a welding signal to the welding electrode E via an electrode contact C and shielding gas (not shown) can be provided to the process generally as described above with respect to FIG. 1. As shown in the exemplary pulsed GMAW process, the power source 120 is operable in waveform-based welding operations to provide the welding signal in the form of a series of pulse-type waveforms by creating a controlled voltage between the electrode E and a grounded workpiece W/P to establish a welding arc A, with the electrode E being advanced toward the workpiece W/P at a controlled rate by a wire feeder 150 of the system 110.

The system 110 further includes a power source controller 130 having non-linear waveform parameter adaptation functionality as described herein, with the feedback system 140 having a current shunt 144 and a voltage sensing component 146 providing welding current and voltage feedback values or signals 142a and 142b, respectively, to the controller 130, wherein power source controller 130 and feedback system 140 together form a non-linear adaptive control system for regulating the power source output. Controller 130 includes a microprocessor 131 and an analog to digital (A/D) conversion device 133 for receiving the feedback values 142 from feedback system 140 and converting these into digital values. The processor 131 operates a waveform generator 162 and a pulse width modulator (PWM) implemented in software 160, wherein the software-based waveform generator 162 comprises a non-linear adaptive control component 163 that provides one or more adapt signals or values ($AV_1$ through $AV_N$) to PWM component 168 for providing one or more control signals 132 to the power source 120, thereby adapting one or more waveform parameters in non-linear fashion based at least in part on the feedback values 142.

In the illustrated embodiment, the feedback value(s) 142 may be scaled using one or more gain factors applied via a gain element 165 following conversion by the A/D 133, and the scaled values are compared with one or more corresponding set points 167 to generate an error signal or value, also referred to herein as a global scaling factor (GSF). The scaling may provide for conversion between measurable process variable units and units of a particular setpoint, for instance, conversion of measured voltage for comparison to a CTWD setpoint, and multiple GSF values may be computed in various embodiments. The GSF is used along with a user selected waveform file 164 and a current system workpoint 170 to index into a state/data table 169 in order to obtain current scaling factors SF1 through SFN for one or more adapted waveform parameters, as well as one or more defined (nominal) values (DV1 through DVN), which are then provided along with the GSF to the non-linear adaptive control element 163. The various system components, including the power source 120, controller 130, feedback system 140, wire feeder 150, and an optional gas supply 180 may be separate components, or one or more of these components of system 110 may be integrated. In addition, one or more of the illustrated components of the welding system 110 may be implemented in distributed fashion in more than one device.

Any type of welding power source 120 may be used that is operable to provide a waveform-based electrical welding signal, and which allows controlled adaptation of one or more waveform parameters according to one or more control signals 132. In the illustrated embodiment, power source 120 is a waveform controlled switching type welding power source 120 that converts incoming three phase supply voltage to provide an electrical welding signal at the output 122 according to one or more pulse width modulated switching signals 132. The illustrated power source 120 includes a rectifier 124 providing a DC bus output to a switching inverter 126. The inverter 126, in turn, drives an output chopper 128, where one or both of the chopper 128 and the inverter 126 are operated according to switching signals from the pulse width modulation component 168 (implemented in controller software 160 in one embodiment) to provide a welding output signal at terminals 122 suitable for application to a waveform-based welding process or operation. In practice, one or both of the output terminals 122 may be coupled through a power source cable (not shown) to wire feeder 150 for ultimate provision of the welding signal to the welding operation through a torch and cable (not shown), although these connections are drawn schematically in FIG. 3 for ease of illustration.

Current and voltage sensors 144 and 146 are provided in feedback system 140, which is integrated within power source 120 in this embodiment to create feedback values or signals 142a and 142b for closed loop control of the applied welding signal waveform. The controller 130 may also be integrated within power source 120, wherein the waveform generation system 162 provides appropriate switching signals 132 to the chopper 128 and/or inverter 126 via the pulse width modulator 168 according to adaptation values AV from the adaptive control element 163 according to a selected desired waveform 164, stored as a file in one example, as well as according to the GSF error value, the system workpoint 170, and a setpoint 167 derived from the state/data table 169. In operation, the system workpoint 170 can be any process parameter, such as wire feed speed, welding voltage, etc., which can be derived or obtained from another system component (e.g., such a user interface, a sequence controller, another welder, or other device communicatively coupled with the controller 130), and the selected waveform 164 is compared to one or more actual welding process conditions 142 from the feedback system 140 via the table 169, set point 167, comparator 166, and adaptive control element 163. The comparison is then used to control the PWM 168 via the adapt value(s) AV to thereby regulate the welding signal in accordance with the desired waveform, wherein one or more waveform parameters are adapted in non-linear fashion according to the feedback value(S) 142.

The waveform generation system 162 and various other components of the power source controller 130 are preferably implemented as software or firmware components running in a microprocessor based hardware platform, although any suitable programmable hardware, software, firmware, logic, etc., or combinations thereof may be used, by which one or more switching signals 132 are created according to a desired waveform or waveform file 164, wherein the switching type power source 120 provides a welding signal according to the switching signal(s) 132. In the illustrated embodiment, moreover, the controller 130 is a state table based switching power source that may receive as inputs, one or more outputs from other system components, such as workpoint 170 from a sequence controller, etc., wherein the illustrated waveform generation system components 163, 165, 166, 167, and PWM 168 may be implemented as a waveform control program running on, or executed by, microprocessor 131, in conjunction with one or more waveform files 164 and state/data tables 169, where the waveform control program operates to define and regulate the output waveform of power source 120 by providing control signals 132 via PWM 168, and where the welding output signal can be a pulse type as illustrated and described herein, or any other waveform-based signal constructed as a series or sequence of waveforms, whether AC or DC.

The feedback system 140 may be any suitable measurement, detection, or sensing apparatus by which one or more feedback values, such as welding current, welding voltage, etc., are sensed and/or derived, and which provides the value or values 142 to the controller 130. In the exemplary system 140, a current shunt 144 senses the welding current provided to the electrode E and provides a suitable signal 142 a to the A/D converter 133. A voltage transducer 146 provides a signal 142 b to the A/D 133 that is representative of the arc voltage. The A/D 133 is operated under control of processor 131 to convert the feedback values 142 into digital values, which can then be scaled in software 160 via scaling component 165, whereby a comparison of the feedback with the setpoint 167 can be performed in corresponding units. For instance, scaling 165 can be used to translate arc voltage or current values 142 to correlate to CTWD or other process measure, depending on the type of setpoint 167 to which the weld operation is being controlled. Processor 131 and the waveform control software 160 may also be functionally interoperative with the gas supply 180 and with the wire feeder 150. The wire feeder 150 in this embodiment includes a processor 152 and corresponding software (not shown) to implement a wire feed speed control algorithm in concert with the power source waveform control, using a motorized wire drive system having a motor M driving one or more rollers 154 to direct the welding electrode E from a supply reel 156 through contact C and to the welding operation.

Power source controller 130 provides selective non-linear control (adaptation) of one or more welding signal waveform parameters, such as peak current, background current, peak voltage, background voltage, period, frequency, peak duration, ramp up rate, ramp up time, ramp up target, ramp down rate, ramp down time, and ramp down target, etc., based at least partially on the feedback value(s) 142, and generally provides the functionality of controller 30 described above in connection with FIG. 1. As discussed above, the exemplary controller 130 and feedback system 140 form a control system for regulating the welding signal according to the process feedback in non-linear fashion, although one or both these can be separate devices. In general, controller 130 is operatively coupled with the feedback system 140 and with the power source 120 through any suitable operational communicative means, whether hardware and/or software, and functions to non-linearly adapt one or more waveform parameters by providing the PWM control signal(s) 132 accordingly, although the invention is not limited to PWM type control signals or values.

Figure 9:
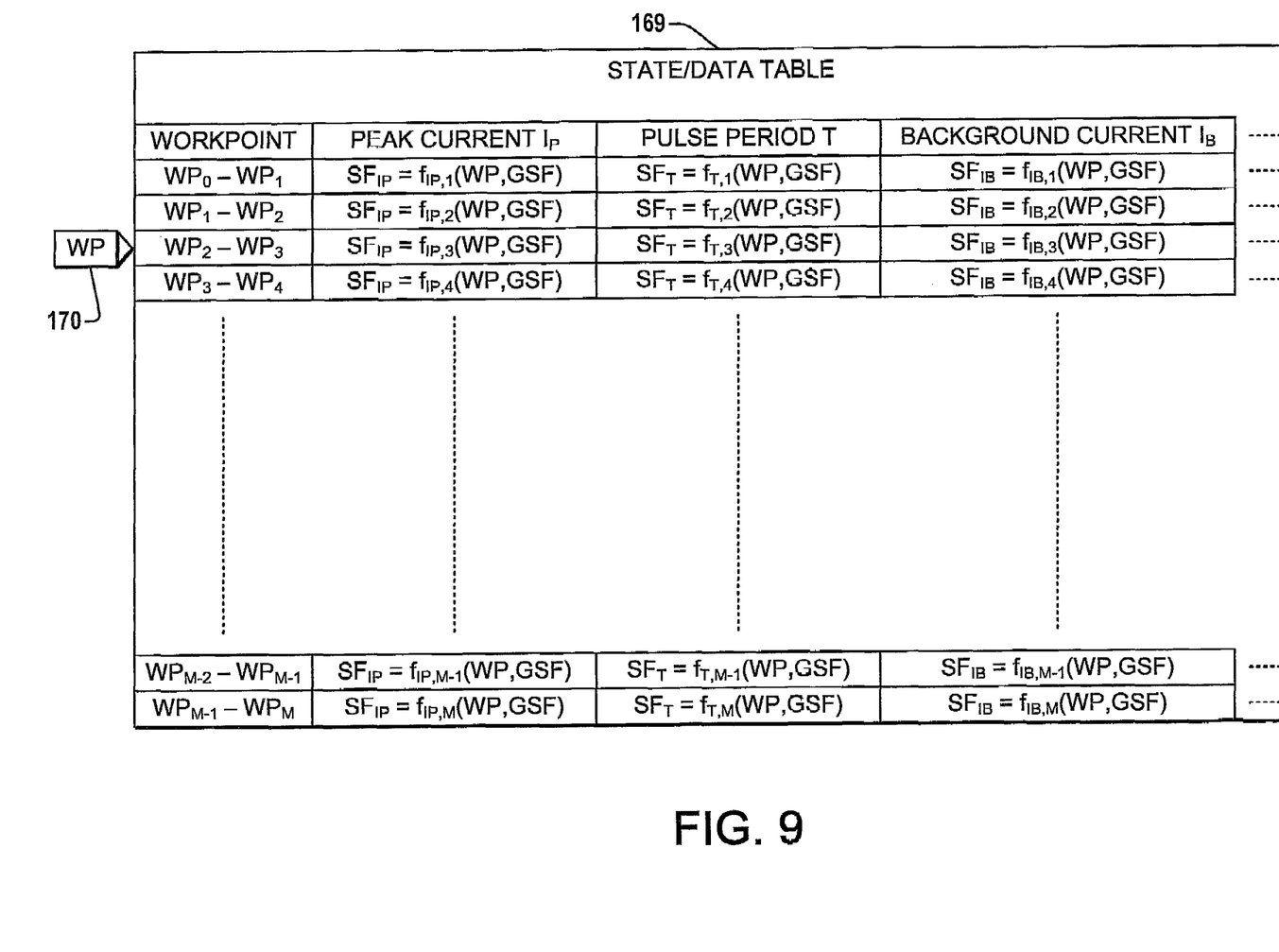
FIG. 9 is a detailed illustration of a state/data table in the non-linear adaptive power source controller of FIG. 3.

Referring now to both FIG. 3 and FIG. 9, the non-linear relationship between the feedback value(s) 132 and the adapted waveform parameter(s) can be achieved by any suitable means. In the illustrated embodiment, the controller 130 includes one or more non-linear equations or formulas (e.g., in the state/data tables 169 of FIGS. 1 and 9) relating the scaling factor SF used for a given adapted waveform parameter to a given feedback value 142 or derivations thereof (e.g., characterized in terms of the global scaling factor GSF in this implementation). The controller 130 further provides processing apparatus (e.g., the adaptive control software component 163 in this case) by which a formula or equation of the table 169 can be evaluated or solved for the current GSF. The controller 130 essentially operates in continuous fashion to obtain a current GSF and to derive corresponding control signal(s) 132, wherein at least one waveform parameter is adapted by the signal(s) 132 in a non-linear fashion with respect to the current GSF. In another suitable implementation, a lookup table type system may be provided alternatively or in combination with equation or algorithm based tables 169, in order to map the current GSF to provide the control signal(s) 132, which may, but need not, employ interpolation techniques.

As shown in FIG. 9, the exemplary state/data table is organized as an indexable data store with a number of entries or rows individually corresponding to a predetermined workpoint value or range of workpoints 170. For a given current workpoint value, therefore, the corresponding table entry is used by the non-linear adaptive control component 163 in mapping GSF to scaling factors SF for one or more adapted waveform parameters being controlled. The state/data table 169 also provides desired or nominal values (DV,-DVN) that essentially identify the center of the adaptive range for a given system workpoint and waveform file, such as the nominal peak current value 52 in the adaptive range 58 shown in FIG. 2A above. In this adaptive regard, the nominal value of peak current, for instance, may vary as a function of time as the power source output proceeds through a given waveform cycle according to the selected waveform. As shown in FIG. 9, the table 169 includes a number of entries indexed according to the workpoint 170. In addition, the table 169 may be partitioned according to the currently selected waveform file 164, whereby different controlled behavior can be defined for different selected waveforms.

Alternatively, multiple selectable state/data tables 169 can be provided, each corresponding to a selected one of the waveform files, or the waveform files and state/data tables can be integrated, wherein the details of the specific partitioning are omitted for sake of brevity. The entries in the exemplary table 169 of FIG. 9, moreover, are segmented into individual columns, each defining a GSF to SF relationship or mapping for a corresponding adaptable waveform parameter, wherein three exemplary adapted parameters are shown in FIG. 9, including peak pulse current ($I_P$), pulse period (T), and background current $I_B$.

Any number of such waveform parameters can be adapted in this fashion, with corresponding entry segments defined therefor, by which the power source output signal can be regulated to correspond to a desired waveform from the file 164. Each row entry includes a number of columns with formulas, or equations, or a set of equation coefficients defining a functional relationship between a particular adapted parameter and GSF, one or more of which relationships are non-linear. Indeed, in several embodiments discussed below in connection with FIGS. 5, 7, and 8, more than one waveform parameter is non-linearly adapted, in order to provide improved controllability for the welding system 110 as a whole. In the example of FIG. 9, the parameter adaptation relationships are shown as functions "f" for each workpoint range (e.g., $f_1$ for the first workpoint range), wherein an integer number M such ranges are shown in the figure, and where the number M of intervals or workpoint ranges can be tailored to provide any desired degree of controllability or granularity. In this regard, more ranges (rows) can be established so as to allow a higher degree of non-linearity for one or more adapted parameters as desired. For peak pulse current $I_P$, for example, scaling factor $SF_{IP}$ is defined as a function $f_{IP,i}$ of workpoint 170 and GSF (e.g., $f_{IP,i}(WP,GSF)$), where i indicates the workpoint range from 1 to M. Other functions are similarly provided for the other illustrated parameters, to define pulse period scaling factors $SF_T$ and background current scaling factors $SF_{IB}$, etc., any or all of which may include non-linear functions.

Figure 4:
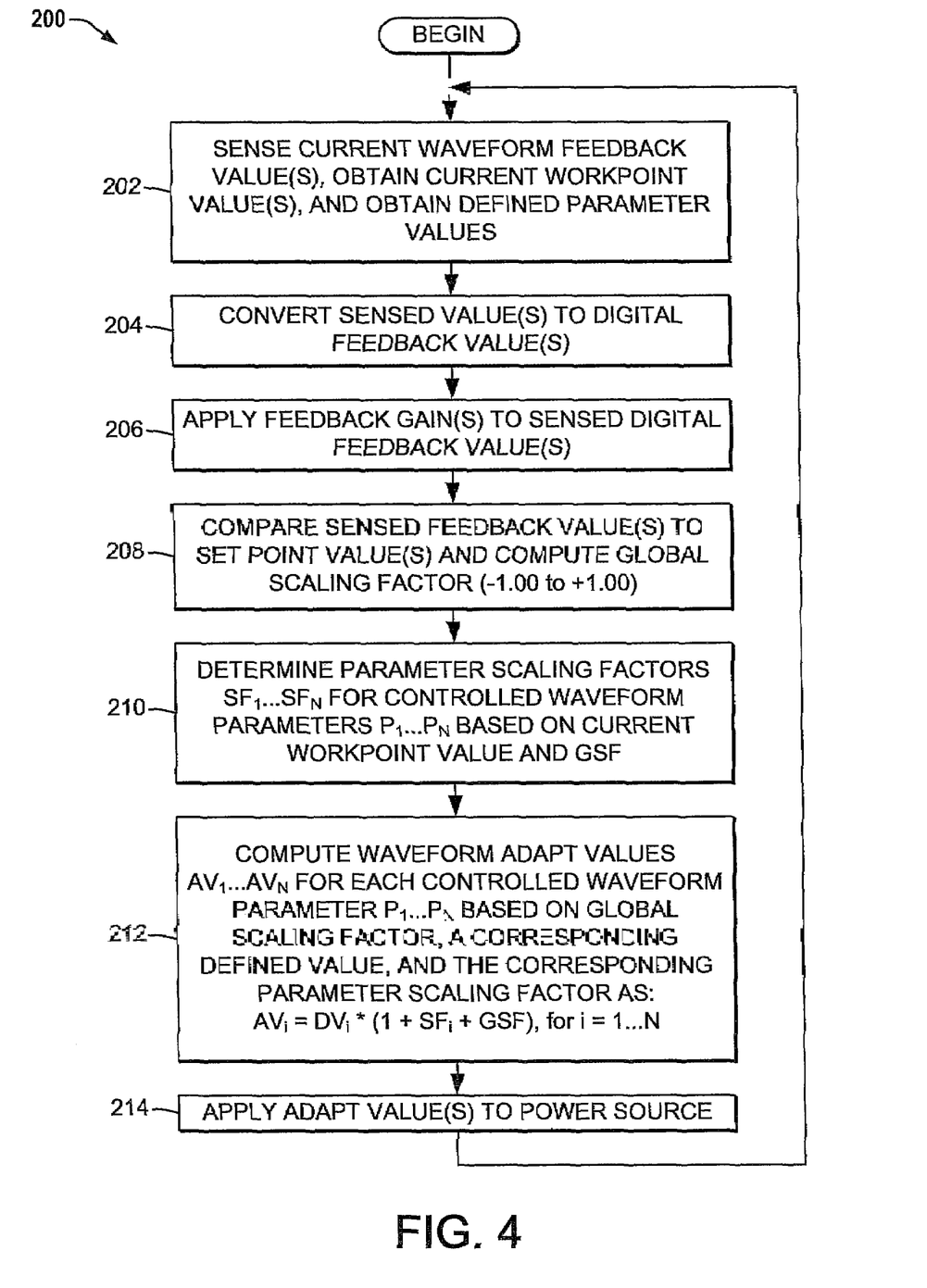
FIG. 4 is a flow diagram illustrating an exemplary method for regulating a welding process in accordance with other aspects of the invention.

Referring also to FIG. 4, the exemplary power source control system formed by the controller 130 and the feedback system 140 are operable according to an exemplary method 200 for regulating a welding process. Although illustrated and described below in the form of a series of acts or events, it will be appreciated that the various methods of the invention are not limited by the illustrated ordering of such acts or events. In this regard, except as specifically provided hereinafter, some acts or events may occur in different order and/or concurrently with other acts or events apart from those illustrated and described herein in accordance with the invention. It is further noted that not all illustrated steps may be required to implement a process or method in accordance with the present invention, and one or more such acts may be combined. The illustrated methods and other methods of the invention may be implemented in hardware, software, or combinations thereof, in order to provide non-linear adaptation of one or more welding waveform parameters, and may be employed in any waveform-based welding operations and in association with any welding equipment, wherein the invention is not limited to the specific applications and embodiments illustrated and described herein.

The illustrated method 200 is essentially performed in a continuous loop fashion, beginning at 202, whereat one or more feedback values associated with the welding process are sensed, including but not limited to welding current and welding voltage, shown as values 142a and 142b in FIG. 3. In this example, moreover, the current workpoint value 170 is obtained at 202, along with the defined waveform parameter values $DV_1$ through $DV_N$ in FIG. 9 (e.g., nominal values) based on the selected waveform file 164 and the current point in the waveform (the current time). The method 200 further includes selectively adapting at least one controlled waveform parameter of the welding signal in non-linear fashion based at least in part on the feedback value(s) 142 from the feedback system 140. As described above, any waveform parameters may be adapted, including but not limited to peak current, background current, peak voltage, background voltage, period, frequency, peak duration, ramp up rate, ramp up time, ramp up target, ramp down rate, ramp down time, ramp down target, or any other parameter(s) that can be used to characterize a welding signal waveform. In the illustrated method 200, the non-linear adaptation is accomplished by digital to analog conversion at 204 (e.g., using A/D 133 in FIG. 3) and application of any appropriate feedback gains 165 at 206, as well as by comparing the converted and scaled feedback value to one or more setpoint values (e.g., via comparison component 166) to derive an error value or GSF at 208, which in one implementation ranges from −1.00 to +1.00.

At 210, a parameter scaling factor (SF) is determined for each adapted or controlled waveform parameter based on the current workpoint value 170 and the error value GSF, wherein one or more of the parameter scaling factors vary non-linearly as a function of the error value GSF. Thereafter at 212 and 214, the controlled waveform parameters are selectively adapted in accordance with the error value GSF and according to the parameter scaling factors SF. In the illustrated embodiment, the parameter scaling factors $SF_1$ through $SF_N$ are determined by the non-linear adaptive control component 163 for an integer number N adapted parameters $P_1$ through $P_N$ at 210 using the table 169 (FIGS. 3 and 9) based on the current workpoint value 170, the selected waveform file 164, and the current GSF. In the example of FIG. 9, the scaling factors are determined by solving the equations or functions, although other computational means can be used, such as lookup tables, with or without interpolation, etc. At 212, waveform adapt values $AV_1$-$AV_N$ are computed in the non-linear adaptive control component 163, corresponding to the adapted or controlled parameters $P_1$-$P_N$, based on the GSF, the defined values $DV_1$-$DV_N$, and based on to the parameter scaling factors $SF_1$-$SF_N$. In the illustrated embodiment, the adapt values AV are computed in the component 163 according to the following equation $AV_i=DV_i*(1+SF_i+GSF)$, for i=1 through N. The computed adapt values $AV_1$-$AV_N$ are then applied by the control component 163 to the PWM component 168 at 214 for providing the control signal(s) 132 to the power source 120, after which the process 200 is repeated as described above.

By the above method 200 or other suitable implementations, the controller 130 of FIG. 3 provides at least one control signal 132 to the power source 120 so as to selectively adapt at least one waveform parameter of the welding signal in non-linear fashion based at least in part on the feedback value(s) 142 from the feedback system 140 to regulate the output of the power source 120. In addition, it is noted that the controller 130 and the control signal(s) 132 provided thereby, may be such that any particular parameter associated with the output welding signal waveform may be non-linearly modified or adapted, including but not limited to peak current, background current, peak voltage, background voltage, period, frequency, peak duration, ramp up rate, ramp up time, ramp up target, ramp down rate, ramp down time, and ramp down target, for example. Furthermore, more than one parameter may be adapted via the adaptive controller 130, wherein certain implementations may provide for selectively adapting two or more waveform parameters in non-linear fashion, depending on the GSF to SF relationships (e.g., formulas) defined in the tables 169.

Referring now to FIGS. 5-8, several exemplary non-linear adaptive control relationships or schemes are graphically illustrated (for a given system workpoint), which may be implemented using the methods and systems of the invention, in particular, by appropriate definition of the entries of tables 169 in the above embodiments. As previously discussed in connection with FIGS. 2A and 2B, the inventors have appreciated that the above described non-linear adaptive control techniques may be advantageously employed to adapt a pulse waveform depending on where in the adaptive range the actual output is, thereby allowing the range of adaptive control to be significantly increased without exceeding the limitations inherent in the physical properties of the welding process itself. For example, the adaptive range of peak current can be significantly increased while enforcing a threshold or minimum value (above the transition current $I_T$) to maintain droplet transfer using non-linear relational entries in the table 169 as described hereinafter.

Figure 5:
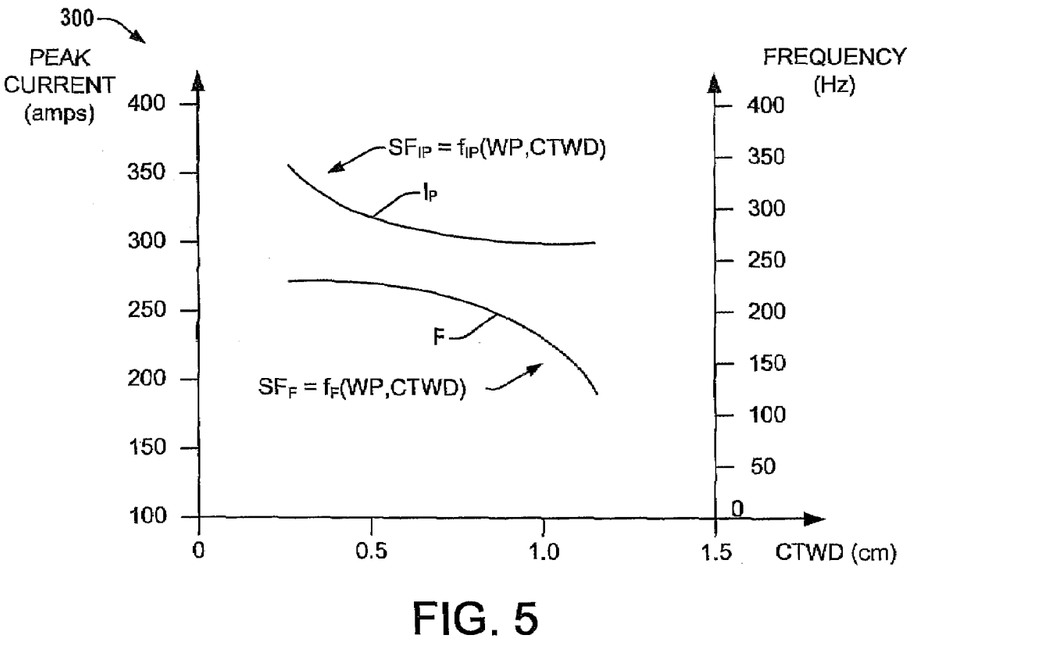
FIG. 5 is a graph showing an exemplary non-linear adaptive control relationship that may be implemented using the methods and systems of the invention, in which peak current and pulse frequency are changed in non-linear fashion as a function of contact-to-work-distance (CTWD)

FIG. 5 provides a graph 300 showing an exemplary non-linear adaptation scheme implemented via appropriate entries in the state/data tables 169 of the controller 130 in FIG. 3 above, in which peak current $I_P$ and pulse frequency F are changed in non-linear fashion as a function of contact-to-work-distance (CTWD), again using the example in which the spray transition current is about 270 amps for a selected welding electrode E and shielding gas type. In this case, the peak current $I_P$ is non-linearly adapted for the current workpoint value 170 according to the relationship $S_{IP}=f_{IP}(WP, CTWD)$, and thereby maintained above a minimum peak current of about 300 amps to prevent degradation of the droplet transfer process. In his example, moreover, one or more other waveform parameters (e.g., frequency) are also adapted as a function of CTWD, so as to at least partly compensate for the non-linear adaptive response of peak current $I_P$, thereby enhancing system performance even where the peak current is at the minimum level. Moreover, in this case, the pulse waveform frequency F is also adapted in non-linear fashion, and its response is minimized at low CTWD values to prevent excessively high frequencies. Thus, the illustrated non-linear adaptive control of peak current $I_P$ and waveform frequency F provides for improved controllability and adjustability of the system performance that may be used to optimize one or more overall system performance metrics using the widest possible adaptive control ranges while successfully avoiding or mitigating the adverse effects of limits attributable to the process physics. Thus, the present invention advantageously allows welding engineers and process designers much wider latitude in process optimization efforts than was possible using conventional linear adaptation techniques.

Figure 6:
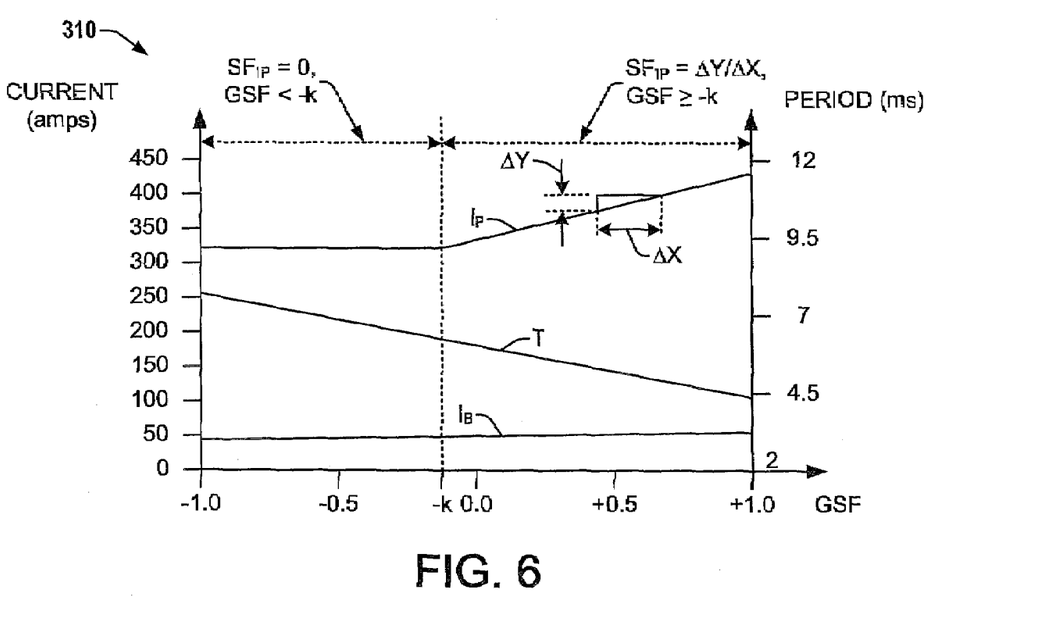
FIG. 6 is a graph illustrating another exemplary non-linear adaptive control scheme with non-linear adaptation of peak current with respect to a global scaling factor (GSF) in accordance with one or more aspects of the invention.

FIG. 6 provides a graph 310 showing another example, in which non-linear adaptation of peak current $I_P$ is provided with respect to a global scaling factor (GSF). In this case, the non-linear adaptive relationship is piecewise linear within two sections of the GSF range, including a first range for GSF less than a value −k for which the peak current scaling factor $SF_{IP}$ is essentially zero. For the remainder of the GSF range, $SF_{IP}=\Delta Y/\Delta X$, thereby providing a dual slope type non-linear adaptation of peak current $I_P$, together with generally linear adaptation for the waveform period T and the background current $I_B$. Comparing FIG. 3 with the situation in FIGS. 2A and 2B above, the inventors have appreciated that the non-linear peak current adaptation or control in this case allows the scale factor $SF_{IP}$ for peak current to be increased to 30% (e.g., whereas SF=15% was used in FIG. 2A) without the risk of the current dropping below the spray transition current $I_T$=270 amps (the use of 30% SF in FIG. 2B caused adaptive range to include values below the transition current $I_T$)

Figure 7:
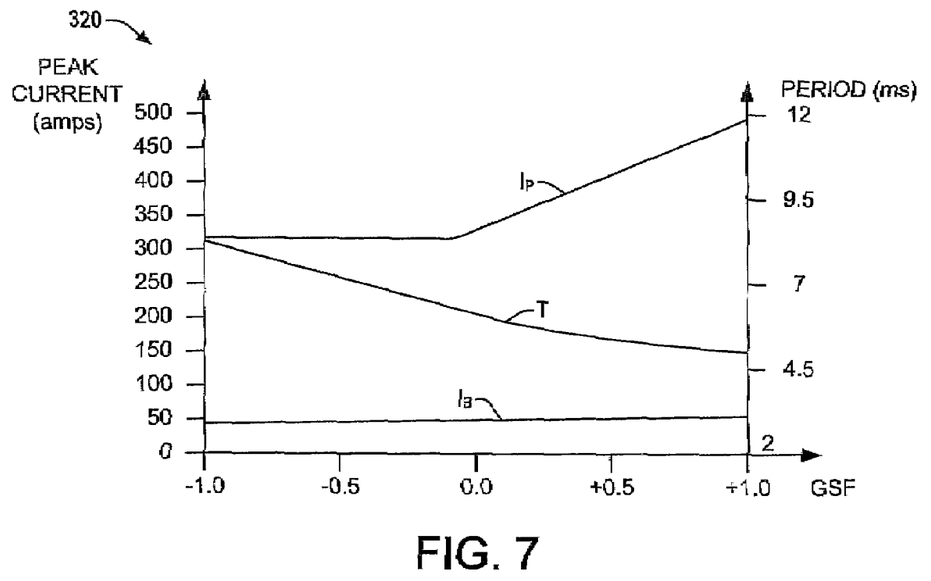
FIG. 7 is a graph illustrating yet another exemplary control relationship in which peak current and the waveform period are adapted in non-linear fashion.

Referring also to FIG. 7, graph 320 shows a control relationship in which both peak current $I_P$ and pulse waveform period T are adapted in non-linear fashion with respect to GSF, where the period T is maintained above about 4.6 ms (e.g., frequency below about 220 Hz) together with rather low background current values ($I_B$) to prevent the above mentioned pulse droplet transfer degradation for high GSF values. In addition, the peak pulse current $I_P$ is kept well above the spray transition level (e.g., 270 amps) even at low GSF values, using the non-linear adaptation of two waveform parameters. In this example, the nominal peak current $I_P$ is about 330 amps (at GSF=0) and the peak current scaling factor $SF_{IP}$ is increased to 50%, thereby allowing fairly high maximum peak currents for high GSF values. The nominal period T in this embodiment is about 6.1 ms with a scale factor $SF_T$ of −35% that tails off non-linearly to a limit of about 5 ms for higher GSF values to reduce the likelihood of the waveform pulses being bunching too closely together.

Figure 8:
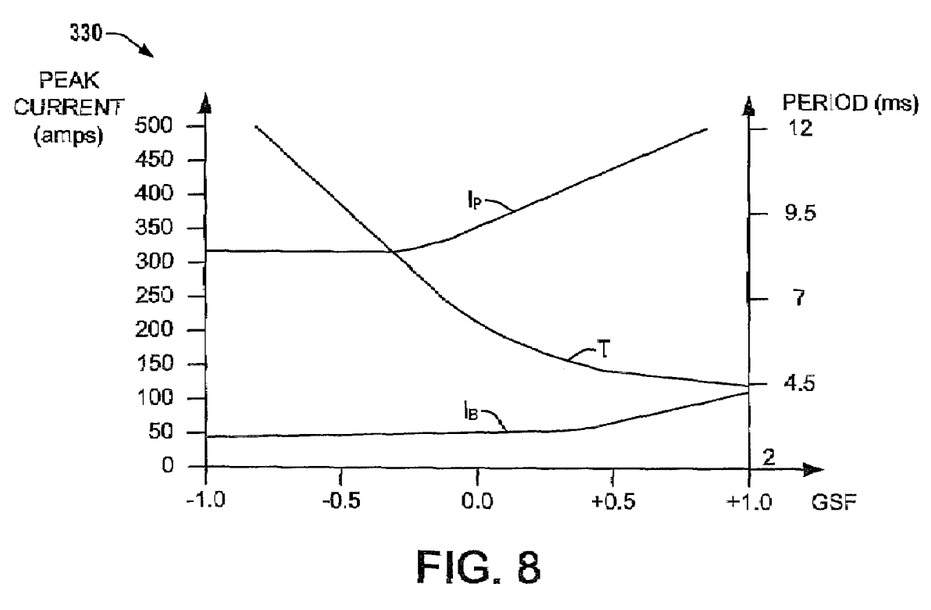
FIG. 8 is a graph illustrating another possible embodiment with selective non-linear adaptation of peak current, background current, and period.

Further extension of the peak current adaptive range is achieved in the embodiment shown in graph 330 of FIG. 8 by also selectively adapting the background current $I_B$ in non-linear fashion in combination with the selective non-linear adaptation of peak current $I_P$ and period T. In this example, the period scale factor $SF_T$ has been significantly increased to 80%, allowing much longer pulse waveforms for low GSF values, while the background current $I_B$ rises more quickly (non-linearly) for GSF values above about 0.4, wherein the limit for the waveform period T and the corresponding increase in background current $I_B$ effectively eliminate the risk of the pulses bunching too closely to one another. As a result of the multi-parameter non-linear control scheme, this embodiment provides a significantly expanded range of adaptive operation, and is able to provide good welding performance throughout its feedback (GSF) range, wherein the degree of non-linearity can be set (e.g., by providing sufficient number of entries in a lookup table implementation or an adequate degree of resolution in the equation definitions for algorithmic implementations of the tables 169) such that as GSF varies, the changes in scaling factor are not abrupt. For instance, in the illustrated example of FIG. 8, none of the parameter adaptive response curves for $I_P$, $I_B$, or T have sharp features, whereby the adaptive control will be smooth throughout the range of operation. Using this control scheme, the welding system 1 10 is capable of adapting to very large changes in the CTWD as well as large changes in the wire feed speed. The concepts of the invention, moreover, can be implemented in synergic type welding systems for pulse or other waveform-based welding operations, in which the selected wire feed speed or other single system workpoint 170 defines all of the waveform parameter nominal values, as well as in non-synergic systems where the wire feed speed is independent of the waveform parameters and the adaptive control determines the operating point(s).

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e., that is functionally equivalent), even though not structurally equivalent to the disclosed structure which performs the function in the illustrated implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

Having thus described the invention, the following is claimed:

1. A welding system, comprising:
   a power source with an output configured to provide a welding signal as a series of waveforms during a welding process;
   a feedback system operatively coupled with said power source and configured to sense at least one feedback parameter associated with said welding process,
   said at least one feedback parameter having a non-linear relationship with at least one waveform parameter of said welding signal, said non-linear relationship providing a larger adaptive range of control defined at least in part by a minimum feedback parameter value associated with a minimum waveform parameter value and a maximum feedback parameter value associated with a maximum waveform parameter value; and
   a controller operatively coupled with said feedback system and with said power source, said controller configured to:
   compare said feedback parameter to a setpoint value to derive an error value,
   determine a parameter scaling factor for said at least one controlled waveform parameter based on a current workpoint value and said error value, said parameter scaling factor varying as a function of said error value over said larger adaptive range of control, and
   modify values of said at least one waveform parameter in response to values of said feedback parameter in accordance with said non-linear relationship, said error value, and said parameter scaling factor such that said larger adaptive range of control has a greater magnitude than a narrower range of adaptive control which can be achieved by a linear relationship between said at least one feedback parameter and said at least one waveform parameter.

2. The welding system of claim 1, wherein said at least one waveform parameter of said welding signal is selected from the group consisting of peak current, background current, peak voltage, background voltage, period, frequency, peak duration, ramp up rate, ramp up time, ramp up target, ramp down rate, ramp down time, and ramp down target.

3. The welding system of claim 1, wherein said at least one feedback parameter is selected from the group consisting of welding current and welding voltage.

4. The welding system of claim 1, wherein said welding process is a pulse GMAW welding process.

5. The welding system of claim 1, wherein said non-linear relationship between said at least one waveform parameter and said at least one feedback parameter is described in a state/data table.

6. The welding system of claim 1, wherein said feedback system senses one or more of the at least one feedback parameter on a continuous basis for a duration of said welding process, and wherein said controller said controller modifies values of said at least one waveform parameter in response to values of said feedback parameter on a continuous basis in accordance with availability of new information related to said one or more of the at least one feedback parameter.

7. The welding system of claim 1 wherein said non-linear relationship between said at least one waveform parameter and said at least one feedback parameter is described by at least one non-linear mathematical formula.

8. The welding system of claim 1 wherein said non-linear relationship between said at least one waveform parameter and said at least one feedback parameter is described by a non-linear waveform file.

9. The welding system of claim 1, wherein said at least one waveform parameter of said welding signal is modified at least in part as a function of contact-to-work-distance (CTWD).

10. The welding system of claim 5, said controller further performs an interpolation on said state/data table to discern an interpolated waveform parameter value between values contained in said state/data table.

11. The welding system of claim 7, wherein two or more waveform parameters including said at least one waveform parameter relate to said at least one feedback parameter by two or more mathematical formulas.

12. A method for regulating a welding process, said method comprising:
 sensing at least one feedback parameter associated with said welding process,
 said at least one feedback parameter having a non-linear relationship with at least one waveform parameter of a welding signal, said non-linear relationship providing a larger adaptive range of control defined at least in part by a minimum feedback parameter value associated with a minimum waveform parameter value and a maximum feedback parameter value associated with a maximum waveform parameter value; and
 selectively modifying at least one controlled waveform parameter of said welding signal in response to said at least one feedback parameter in accordance with said non-linear relationship, such that said larger adaptive range of control has a greater magnitude than a narrower adaptive range of control which can be achieved by a linear relationship between said at least one feedback parameter and said at least one waveform parameter,
 wherein selectively modifying at least one controlled waveform parameter comprises:
  comparing said feedback parameter to a setpoint value to derive an error value;
  determining a parameter scaling factor for said at least one controlled waveform parameter based on a current workpoint value and said error value, said parameter scaling factor varying as a function of said error value over said larger adaptive range of control; and
  selectively modifying said at least one controlled waveform parameter according to said error value and said parameter scaling factor.

13. The method of claim 12, wherein said at least one waveform parameter is selected from the group consisting of peak current, background current, peak voltage, background voltage, period, frequency, peak duration, ramp up rate, ramp up time, ramp up target, ramp down rate, ramp down time, and ramp down target.

14. The method of claim 12, wherein said at least one feedback parameter is selected from the group consisting of welding current and welding voltage.

15. The method of claim 12, wherein said at least one feedback parameter is selected from the group consisting of welding current and welding voltage.

16. A control system for regulating the output welding signal of a welding power source in a welding process, said control system comprising:
 means for sensing at least one feedback parameter associated with said welding process,
 said at least one feedback parameter having a non-linear relationship with at least one waveform parameter of said welding signal, said non-linear relationship providing a larger adaptive range of control defined at least in part by a minimum feedback parameter value associated with a minimum waveform parameter value and a maximum feedback parameter value associated with a maximum waveform parameter value; and
 means for selectively adapting at least one controlled waveform parameter of said welding signal in response to said at least one feedback parameter in accordance with said non-linear relationship, such that said larger adaptive range of control has a greater magnitude than a narrower range of adaptive control which can be achieved by a linear relationship between said at least one feedback parameter and said at least one waveform parameter,
 wherein said means for selectively modifying at least one controlled waveform parameter includes:
  means for comparing said feedback parameter to a setpoint value to derive an error value;
  means for determining a parameter scaling factor for said at least one controlled waveform parameter based on a current workpoint value and said error value, said parameter scaling factor varying as a function of said error value over said larger adaptive range of control; and
  means for selectively modifying said at least one controlled waveform parameter according to said error value and according to said parameter scaling factor.

17. The control system of claim 16, wherein said means for selectively adapting comprises:
 means for comparing said feedback parameter to a setpoint value to derive an error value;
 means for determining a parameter scaling factor for said at least one controlled waveform parameter based on a current workpoint value and said error value, said parameter scaling factor varying as a function of said error value over said larger adaptive range of adapting control having a greater magnitude than that which can be achieved by a linear relationship between said at least one feedback parameter and said at least one waveform parameter; and
 means for selectively modifying said at least one controlled waveform parameter according to said error value and according to said parameter scaling factor.

18. The control system of claim 16, wherein said at least one waveform parameter of said welding signal is selected from the group consisting of peak current, background current, peak voltage, background voltage, period, frequency, peak duration, ramp up rate, ramp up time, ramp up target, ramp down rate, ramp down time and ramp down target.

19. The control system of claim 16, wherein said at least one feedback parameter is selected from the group consisting of welding current and welding voltage.

* * * * *